April 3, 1928.

H. J. HARTNETT 1,665,029

COMBINATION WATER FAUCET AND SINK TRAP

Filed April 13, 1925

Inventor
Henry J. Hartnett.
by: Hazard and Miller
Attys.

Patented Apr. 3, 1928.

1,665,029

UNITED STATES PATENT OFFICE.

HENRY J. HARTNETT, OF LOS ANGELES, CALIFORNIA.

COMBINATION WATER FAUCET AND SINK TRAP.

Application filed April 13, 1925. Serial No. 22,919.

This invention is a combination water faucet and sink trap and consists of the novel features herein shown, described and claimed.

An object is to make a valve pipe connection between the water pipe behind the faucet and the discharge end of a sink trap, so that when desired the water may be discharged into the trap substantially in the direction of flow from the trap, to suck out the trap and wash out the drain.

Other objects and advantages will appear from the drawings and specification. The drawings illustrate the invention.

Figure 1:
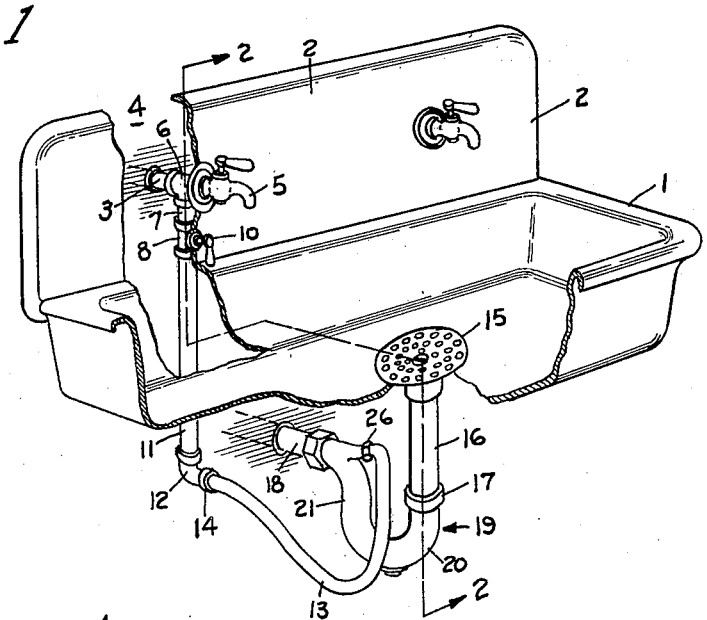
Figure 1 is a fragmentary perspective of a combination water faucet and sink trap embodying the principles of my invention and ready for use.
Figure 2:
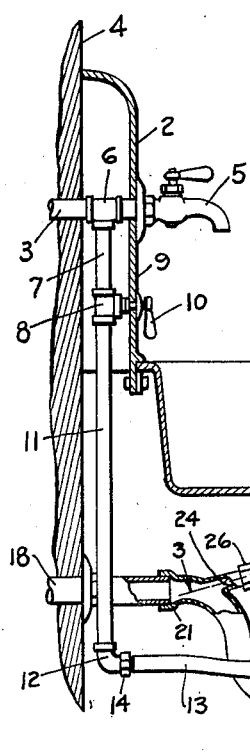
Fig. 2 is a vertical cross-sectional detail on the line 2—2 of Fig. 1.
Figure 3:
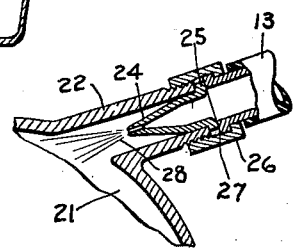
Fig. 3 is an enlarged sectional detail on the line 3—3 of Fig. 2.

The details of construction and operation are as follows:

The sink 1 and the splash board 2 may be any of the ordinary constructions, and as is usual the water pipe 3 comes through the wall 4 and through the splash board 2 and has a faucet 5 upon its forward end discharging into the sink 1.

In carrying out my invention, a T 6 is incorporated into the water pipe 3 behind the faucet 5 and behind the splash board 2. A pipe 7 extends downwardly from the T 6. A cut-off valve 8 is connected to the pipe 7 and the operating stem 9 of the cut-off valve extends through the splash board 2 and has a handle 10 in front of the splash board and below the faucet 5.

A pipe 11 extends downwardly from the valve 8 and has an elbow 12 upon its lower end. A piece of lead pipe 13 is connected to the elbow 12 by a union 14. The usual strainer 15 is mounted in the bottom of the sink 1, a drain pipe 16 extends straight down from the strainer 15 and has a union 17 upon its lower end. The sink drain pipe 18 leads through the wall 4. The sink trap member 19 is connected to the union 17 and to the drain pipe 18. The sink trap member 19 has a U-shaped bend 20, with a drain plug 21 at its lower part. The discharge end 21 of the trap 19 is substantially horizontal. A branch 22 is formed upon this discharge end 21 and extends upwardly at an angle of about 30° relative to a horizontal plane.

A tapered nozzle 24 fits in branch 22 and has a flange 25 fitting against the end face thereof and the nozzle discharges downwardly and backwardly towards the drain pipe 18.

The lead pipe 13 carries the union member or nut 26 behind the flange 27 and the flange 27 fits against the flange 25 and the member 26 screws upon branch 22 to couple the pipe 13 to the trap.

In the practical operation, when it is desired to clean the sink trap 19 or the drain pipe 18 the faucet 5 is closed, the valve 8 is opened by manipulating a handle 10 and water from the supply pipe 3 flows through the nozzle 24 at a high rate of speed and at a considerable pressure and the water 28 is discharged from the nozzle 24 downwardly and backwardly into the rear end of the trap 19, thereby causing a suction to draw the dirt out of the trap and producing a force to push the dirt backwardly through the drain pipe 18.

It will be noted from the construction upon the drawing that the arrangement of the nozzle 24 is such that water will be discharged in the direction of out-flow from the trap and substantially along the center of the horizontal portion of the trap. In this way I employ the kinetic energy available in the water to force out sediment as distinguished from merely the static pressure which may be developed in the pipe leading from the water supply. The high velocity of water obtained by discharging it through the nozzle not only produces the partial vacuum in the trap but causes the water to impinge upon sediment in the horizontal portion with a considerable force, so that all impurities which may tend to collect or clog in the horizontal portion of the trap can be much more readily cleaned out and the horizontal portion will be washed very clean.

While I am in favor of the use of the nozzle 24, it is obvious that this feature may be omitted when desired.

Various changes may be made without departing from the spirit of my invention as claimed.

I claim:

A sink having a drain trap formed by a conduit extending downwardly from the bottom of the trap, then upwardly and then horizontally, a water supply for the sink, a valve controlled conduit leading from the water supply to the trap, said conduit being located at the point where the upwardly extending portion of the trap bends into the horizontally extending portion and being so arranged as to discharge water in the direction of out-flow from the trap substantially in the center of the horizontal portion of the trap, and a nozzle mounted in the conduit forming the trap through which the water discharges to materially increase its velocity.

In testimony whereof I have signed my name to this specification.

HENRY J. HARTNETT.